(12) United States Patent
Hirunuma et al.

(10) Patent No.: US 7,583,891 B2
(45) Date of Patent: Sep. 1, 2009

(54) LOCK MECHANISM FOR STAGE APPARATUS

(75) Inventors: Ken Hirunuma, Tokyo (JP); Satoru Nemoto, Saitama (JP)

(73) Assignee: Hoya Corporation, Tokyo (JP)

( * ) Notice: Subject to any disclaimer, the term of this patent is extended or adjusted under 35 U.S.C. 154(b) by 557 days.

(21) Appl. No.: 11/539,193

(22) Filed: Oct. 6, 2006

(65) Prior Publication Data

US 2007/0096677 A1      May 3, 2007

(30) Foreign Application Priority Data

Oct. 6, 2005    (JP)    ............ P2005-294089

(51) Int. Cl.
G03B 17/00     (2006.01)
(52) U.S. Cl. ............ 396/55; 292/150; 33/1 M
(58) Field of Classification Search .......... 396/55; 292/150; 33/1 M
See application file for complete search history.

(56) References Cited

U.S. PATENT DOCUMENTS

2005/0204640 A1 *   9/2005  Seo ........................... 52/7

FOREIGN PATENT DOCUMENTS

JP         3431020          5/2003

OTHER PUBLICATIONS

U.S. Appl. No. 11/539,186 to Hirunuma et al., filed Oct. 6, 2006.
U.S. Appl. No. 11/539,188 to Hirunuma et al., filed Oct. 6, 2006.

* cited by examiner

*Primary Examiner*—WB Pekey
*Assistant Examiner*—Fang-Chi Chang
(74) *Attorney, Agent, or Firm*—Greenblum & Bernstein, P.L.C.

(57) ABSTRACT

A lock mechanism for a stage apparatus, the stage apparatus having a stationary support board and a movable stage relatively movable in a plane parallel to the stationary support board, includes a pair of engaging members projecting from the movable stage; a rotational lock device including a pair of arm members rotatably mounted and relatively rotatable between an engaged position at which facing free ends of the arm members clasp corresponding engaging members, and a disengaged position at which the facing free ends of the arm members move away from the corresponding engaging members; a lock driving device which rotates the arm members to the engaged position upon the movable stage entering a non-operational state; and an unlock driving device which rotates the arm members to the disengaged position so that the movable stage enters an operational state.

9 Claims, 9 Drawing Sheets

LOCK MECHANISM FOR STAGE APPARATUS

BACKGROUND OF THE INVENTION

1. Field of the Invention

The present invention relates to a lock mechanism for a stage apparatus which locks a movable stage of the stage apparatus in a non-operational state when the movable stage, which is freely movable along a specific plane, is in a non-operational state.

2. Description of the Prior Art

An example of a lock mechanism for a movable stage, the movable stage being movable in a specific X-direction and a Y-direction orthogonal to the X-direction and to which an image pickup device is fixed on a front surface thereof, is disclosed in Japanese Patent No.3431020. The lock mechanism disclosed therein is provided with one cylindrical boss projecting from the back surface of a movable stage, and first and second abutting members provided behind the movable stage on mutually opposing sides of the cylindrical boss. The first and second abutting members are movable in a direction parallel to the movable stage.

When the movable stage is in a non-operational state where no hand-shake correction is performed, the first abutting member and the second abutting member mutually move toward a locked position. Accordingly, since approximately half-circle shaped engaging recesses, respectively formed on opposing surfaces of the first and second abutting members, clasp the cylindrical boss, the movable stage is locked by the first and second abutting members.

Since the above described lock mechanism is a construction whereby one cylindrical boss is clasped by the approximately half-circle shaped engaging recesses of the first and second abutting members, the movable stage cannot be securely locked without the first and second abutting members contacting the cylindrical boss with a strong force.

However, in order for the first and second abutting members to contact the cylindrical boss with a strong force, the size of the driving device of the lock mechanism needs to be increased, which undesirably increases the size of the lock mechanism and the stage apparatus.

Furthermore, in the case where this lock mechanism of the prior art is applied to a camera-shake (hand-shake) correction apparatus which corrects 'rotational shake', an additional problem occurs. Namely, in this kind of camera-shake correction apparatus, the stage is rotatable. However, in the above described lock mechanism of the prior art, since there is only one boss (i.e., the cylindrical boss), even if the first and second abutting members clasp this boss, the movable stage cannot be locked so as to be prevented from being rotated.

SUMMARY OF THE INVENTION

The present invention provides a lock mechanism for a stage apparatus which can securely lock a movable stage thereof without requiring a large driving forcer and can prevent the movable stage from being rotated when in a locked state.

According to an aspect of the present invention, a lock mechanism for a stage apparatus is provided, the stage apparatus having a stationary support board and a movable stage which is relatively movable in a plane parallel to the stationary support board, including a pair of engaging members which project from a surface of the movable stage; a rotational lock device including a pair of arm members rotatably mounted at center portions thereof on a common rotational shaft so that the arm members are relatively rotatable to each other, wherein the arm members are rotatable between an engaged position at which one and the other pairs of facing free ends of the arm members clasp corresponding one and the other the engaging members, and a disengaged position at which the one and the other of the pairs of facing free ends of the arm members move away from the corresponding one and the other the engaging members; a lock driving device which rotates the arm members to the engaged position upon the movable stage entering a non-operational state; and an unlock driving device which rotates the arm members to the disengaged position so that the movable stage enters an operational state.

It is desirable for the lock mechanism for the stage apparatus to include a slide plate which is movable, relative to the stationary support board, between the engaged position and the disengaged position in a direction along a straight reference line orthogonal to a straight imaginary line connecting the engaging members. The lock driving device drives the slide plate so as to move to the engaged position.

It is desirable for the one and the other pairs of the facing free ends of the arm members to clasp the one and the other the engaging members at positions symmetrical to the straight reference line.

It is desirable for the lock driving device to include a magnetic-force generator mounted on the stationary support board; and a drive coil mounted on the slide plate, the drive coil generating a driving force in a direction along the straight reference line upon electric current being supplied to the drive coil while receiving a magnetic force from the magnetic-force generator.

It is desirable for a biasing device to be provided on each the arm member so as to rotationally bias the each arm member toward the disengaged position.

It is desirable for the lock mechanism for the stage apparatus to include a first retaining device for holding the slide plate at the engaged position upon the slide plate moving to the engaged position, and a second retaining device for holding the slide plate at the disengaged position upon the slide plate moving to the disengaged position.

It is desirable for the second retaining device to be a biasing device provided on each of the arm member so as to rotationally bias each arm member toward the disengaged position.

It is desirable for the lock mechanism to include a pair of flat abutting members provided on the slide plate, and a pair of cylindrical abutting members provided on one of the flat abutting members and the pair of arm members. The slide plate and the pair of arm members are interconnected via the flat abutting members and the cylindrical abutting members.

It is desirable for one of the flat abutting members to include a resiliently biased abutting member which is resiliently biased so as to abut against corresponding one of the cylindrical abutting members so that the slide plate contacts the pair of arm members via the resiliently biased abutting member.

According to the present invention, since a pair of engaging members are locked by a pair of arm members when the movable stage is in a non-operational state, the movable stage can be locked more strongly in a non-operational state than that of the prior art. Furthermore, since the pair of engaging members are lock-engaged by a pair of lock members, the rotatable movable stage can be locked into a state so as to be prevented from being rotated.

In addition, the pair of arm members are engaged with the engaging members by being rotated and clasped in a direction parallel to a fixed support plate. Accordingly, in the case where the stage apparatus of the present invention is applied to a hand-shake (camera-shake) correction apparatus, no force is exerted on the engaging members in the optical axis direction during a locking operation of the movable stage, and hence, such a locking operation has no adverse effect on the focus state of the image pickup device. Furthermore, since the pair of arm members clasp both sides of the engaging members with an equal force during a locking operation, a force which would bend the engaging members is not exerted thereon, and hence, no excess force is exerted on the image pickup device or the movable stage during the locking operation. Therefore, there is no adverse effect on the object image (captured image) caused by deforming/bending of the image pickup device.

Furthermore, since the construction of the lock mechanism of the present invention is very simple, a reduction in manufacturing costs is also possible.

The present disclosure relates to subject matter contained in Japanese Patent Application No. 2005-294089 (filed on Oct. 6, 2005) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

An embodiment of the present invention will be described hereinafter with reference to the drawings. In the following description, as shown by the arrows in FIGS. 1 and 2, the left/right direction, the upward/downward direction, and the forward/rearward direction of a camera-shake correction apparatus (hand-shake correction apparatus/stage apparatus) 30 is defined as the x-direction, the Y-direction and the Z-direction, respectively.

Firstly the camera-shake correction apparatus 30, which has a lock mechanism 100 of the present invention installed therein, will be described.

Figure 1:
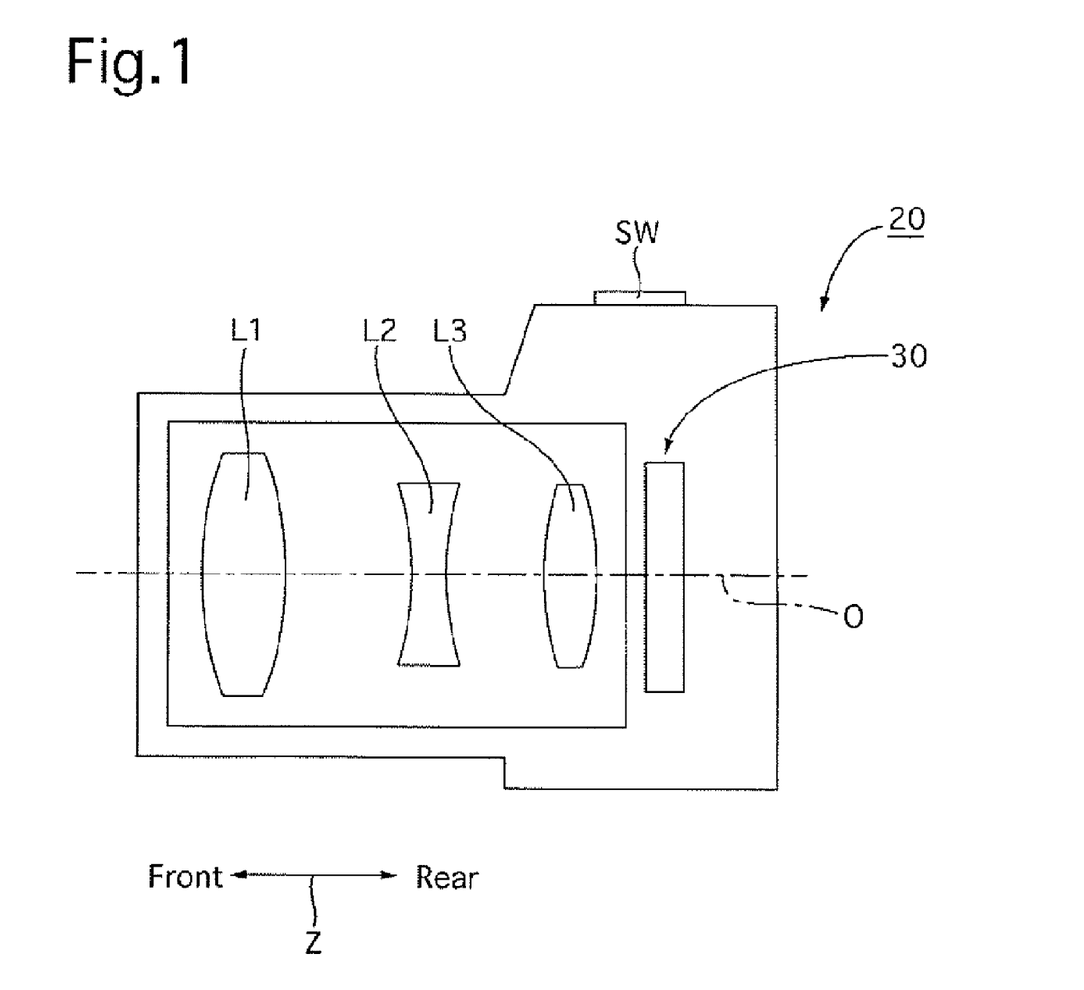
FIG. 1 is a longitudinal sectional view of a digital camera having installed therein a camera-shake correction apparatus according to an embodiment of the present invention.

As shown in FIG. 1, an optical system having first, second and third lens groups L1, L2 and L3, is provided in a digital camera 20, and the camera-shake correction apparatus 30 is provided behind the third lens group L3.

Figure 2:
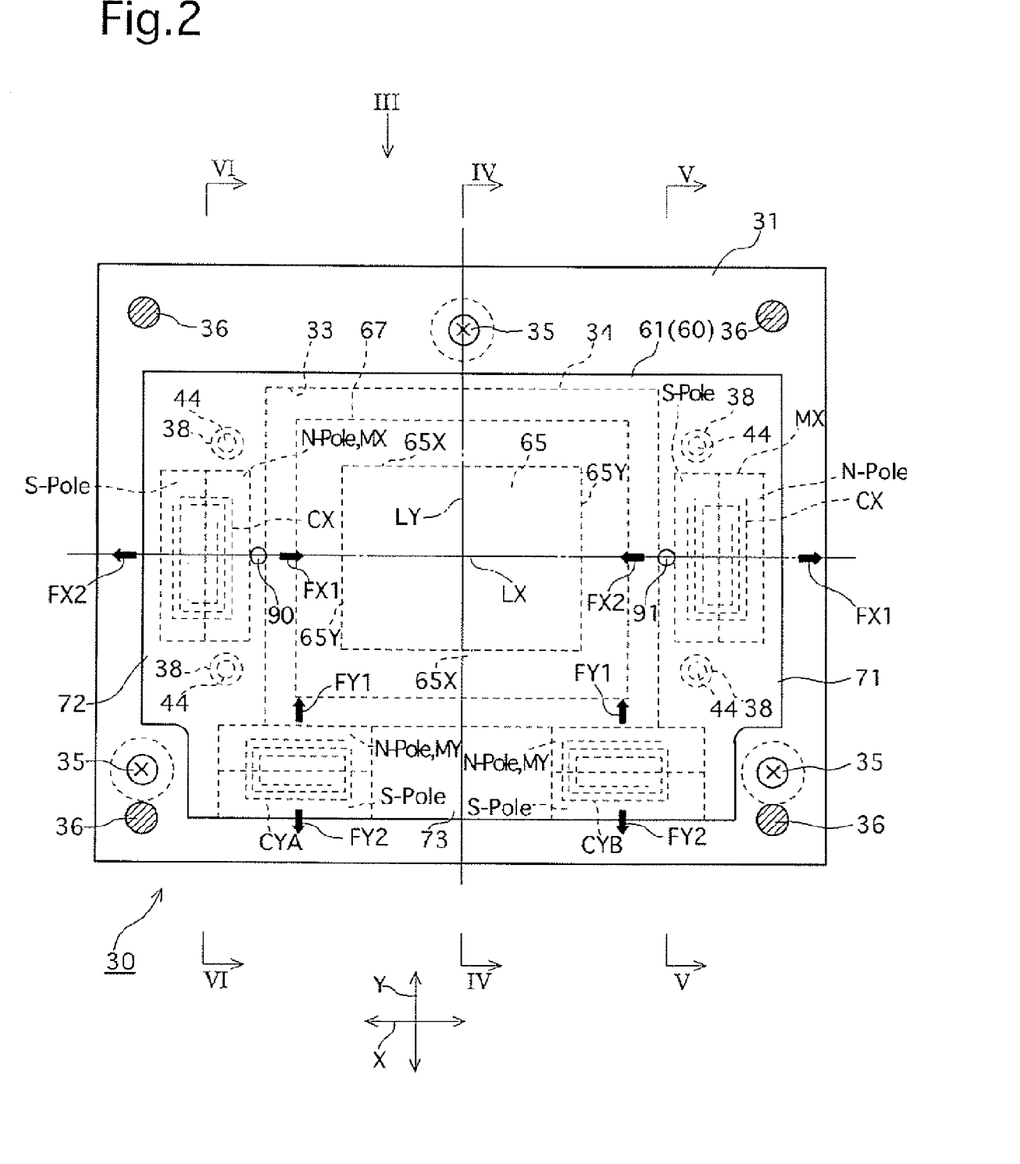
FIG. 2 is a rear view of the camera-shake correction apparatus with the rear plate omitted for clarity.

The camera-shake correction apparatus 30 has a construction as shown in FIGS. 2 through 6. As shown in FIGS. 2 through 6, the camera-shake correction: apparatus 30 is provided with a front stationary support board 31, which has a horizontal rectangular shape (as viewed from the front thereof) and is made from a magnetic material such as a soft iron, and a rear stationary support board 32 having the same size and shape as that of the front stationary support board 31 and is also made from a magnetic material such as a soft iron. The front stationary support board 31 and the rear stationary support board 32 are connected to each other in the vicinity of the four corners at the opposing surfaces thereof by four support cylindrical columns 36, respectively, which extend in the forward/rearward direction (Z-direction). The front stationary support board 31 and the rear stationary support board 32 that are thus connected to each other are parallel to each other. The front stationary support board 31 is provided in a central portion thereof with a rectangular mounting hole (through-hole) 33 in which a transparent infrared-cut filter 34 having the same rectangular shape as the rectangular mounting hole 33 is fitted to be mounted thereto. As shown in FIG. 2, through-holes are formed in the front stationary support board 31 at three different positions, and three set screws 35 are inserted into the three through holes, respectively. The three set screws 35 are screwed into three female screw holes (not shown) formed on an inner surface of a camera body of the digital camera 20, so that the inclination angle of the front stationary support board 31 with respect to the camera body is adjusted by adjusting the amount of engagement of the three set screws 35 with the female screw holes.

The front stationary support board 31 is provided, on the rear surface thereof at four positions thereon, with four cylindrical support projections 38, respectively, which project rearward. A front half portion of each of four metal balls 44 is rotatably supported in a hemispherical recess (not shown) formed in a rear end of each of the four cylindrical support projections 38, respectively. Four support projections 47 are formed on the rear stationary support board 32 at four positions thereon aligned with the four cylindrical support projections 38, respectively, so as to extend mutually towards each other, respectively, in the forward/rearward direction (Z-direction). A rear half portion of each of four metal balls 52 is rotatably supported in a hemispherical recess (not shown) formed in a front end of each of the four cylindrical support projections 47, respectively.

The camera shake correction apparatus 30 is provided, on the rear surface of the front stationary support board 31 at opposite ends thereof in the left/right direction, with two X-direction magnets MX which are secured to the rear surface of the front stationary support board 31 so that an S-pole and an N-pole of each X-direction magnet MX are aligned in the X-direction. The two X-direction magnets MX are aligned in the X-axis direction and the positions of the two X-direction magnets MX in the Y-axis direction are the same. Two X-direction magnetic circuits are formed between the two X-direction magnets MX and two portions of the rear stationary support board 32 which face the two X-direction magnets MX in the forward/rearward direction, respectively, due to the magnetic flux of the two X-direction magnets MX passing through the front stationary support board 31 and the rear stationary support board 32. Namely, the front stationary support board 31 and the rear stationary support board 32 function as yokes.

Figure 4:
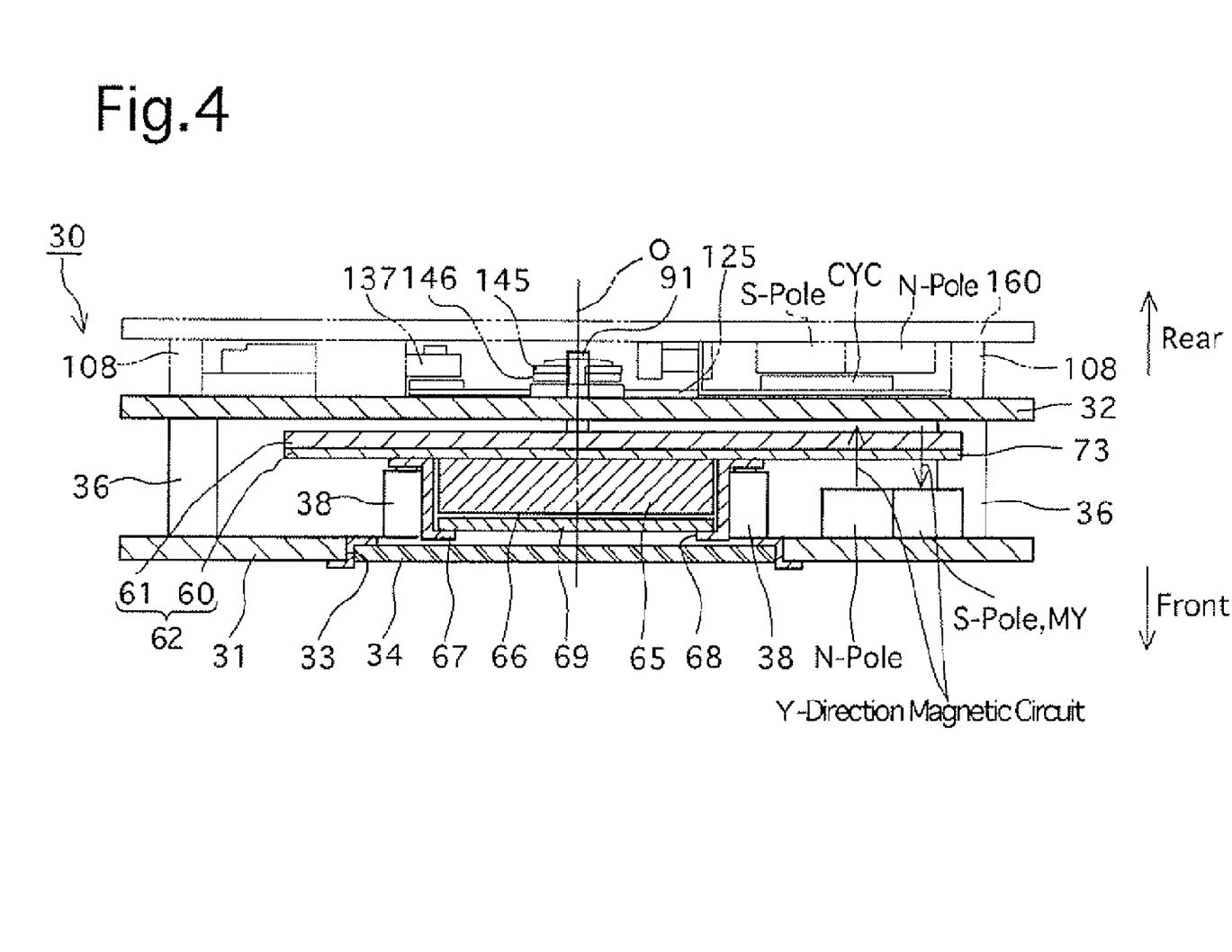
FIG. 4 is a cross sectional view of the camera-shake correction apparatus taken along the IV-IV line shown in FIG. 2.
Figure 5:
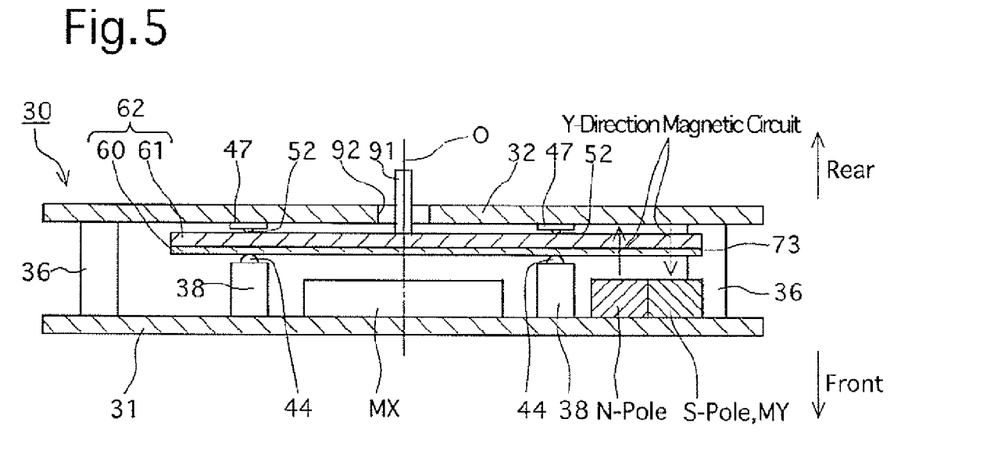
FIG. 5 is a cross sectional view of the camera-shake correction apparatus taken along the V-V line shown in FIG. 2.
Figure 6:
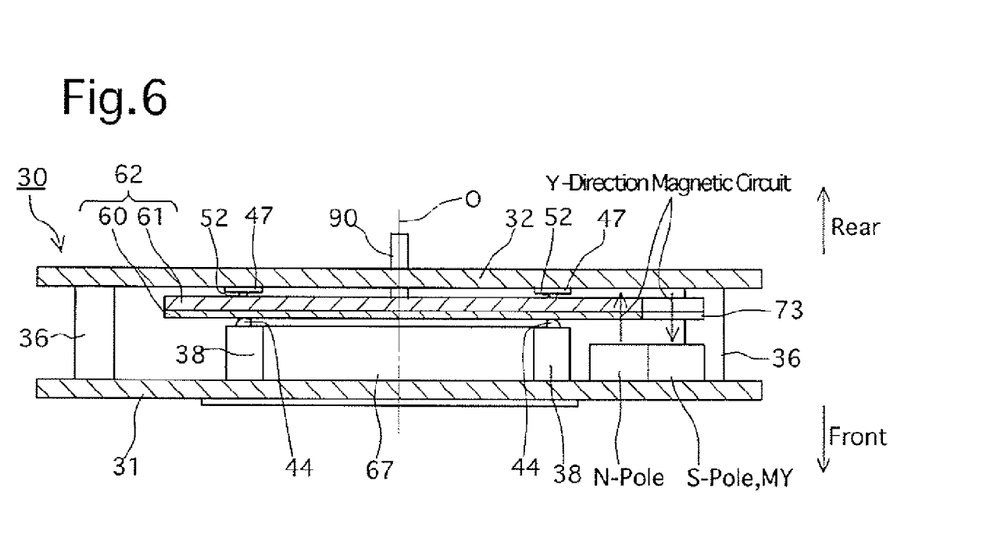
FIG. 6 is a cross sectional view of the camera-shake correction apparatus taken along the VI-VI line shown in FIG. 2.

The camera shake correction apparatus 30 is provided, on the rear surface of the front stationary support board 31 at a lower end thereof, with two Y-direction magnets (left and right Y-direction magnets) MY which are secured to the rear surface of the front stationary support board 31 so that an S-pole and an N-pole of each Y-direction magnet MY are aligned in the Y-direction. The two Y-direction magnets MY are aligned in the X-axis direction and the positions of the two Y-axis-direction magnets MY in the Y-axis direction are the same. As shown in FIGS. 4 through 6, two Y-axis-direction magnetic circuits are formed between the two Y-direction magnets MY and two portions of the rear stationary support board 32 which face the two Y-direction magnets MY in the forward/rearward direction, respectively, due to the magnetic flux of the two Y-direction magnets MY passing through the front stationary support board 31 and the rear stationary support board 32. Namely, the front stationary support board 31 and the rear stationary support board 32 function as yokes.

The camera shake correction apparatus 30 is provided with an electrical board 60, which is a flat rectangular board, and a reinforcing plate 61 having the same shape as the electrical board 60 as viewed from the front and is fixed to the back of the electrical board 60 to be integral therewith so that the electrical board 60 and the reinforcing plate 61 constitute a movable stage 62. AS shown in FIGS. 3 through 6, the four metal balls 44 are in contact with the front surface of the electrical board 60 (i.e., the front surface of the movable stage 62) at four points to be freely rotatable thereat, and the four metal balls 52 are in contact with the rear surface of the reinforcing plate 61 (i.e., the rear surface on the movable stage 62) at four points to be freely rotatable thereat. In other words, the movable stage 62, which is constructed from the electrical board 60 and the reinforcing plate 61, is held between the four metal balls 44 and the four metal balls 52 in the forward/rearward position, and the movable stage 62 is provided orthogonal to the optical axis O of the optical system having the first, second and third lens groups L1, L2 and L3 (and the movable stage 62 is parallel to the front and rear stationary support boards 31 and 32).

Accordingly, the movable stage 62 is movable in an X-Y plane parallel to both the X-direction and the Y-direction (i.e. , orthogonal to the optical axis O) relative to the front stationary support board 31 and the rear stationary support board 32 from the initial positionshown in FIG. 2. In addition, the electrical board 60 (of the movable stage 62) and the front stationary support board 31 are provided with a common moving range limiting device (not shown) which limits the range of movement of the movable stage 62 relative to the front stationary support board 31 to a predetermined range of movement. For example, the common moving range limiting device can be constructed from holes provided in one of the movable stage 62 and the front stationary support board 31 and corresponding projections, which extend through the holes, provided in the other of the movable stage 62 and the front stationary support board 31.

A CCD (image pickup device) 65 is fixed to a front surface of the electrical board 60 at the center thereof. As shown in FIG. 2, the CCD 65 is in the shape of a rectangle as viewed from the front thereof. The CCD 65 is provided with a pair of X-direction edges (upper and lower K-direction edges) 65X which extend parallel to each other in the X-direction and a pair of Y-direction edges (right and left Y-direction edges) 65Y which extend parallel to each other in the Y-direction, in the state shown in FIG. 2 in which the electrical board 60 (movable stage 62) is in the initial position thereof.

A CCD holder 67 which surrounds the CCD 65 is fixed to the front of the electrical board 60 in an airtight fashion (dust-tight fashion). The CCD holder 67 is provided on a front wall thereof with an aperture 68 having a rectangular shape as viewed from the front of the camera shake correction apparatus 30. An optical low-pass filter 69 is installed in the internal space of the CCD holder 67 to be fixedly fitted therein between the front wall of the CCD holder 67 and the CCD 65. The space between the optical low-pass filter 69 and the front wall of the CCD holder 67 is maintained in an air-tight state. An imaging surface 66 of the CCD 65 faces the optical low-pass filter 69. The CCD 65, the optical low-pass filter 69, the aperture 68 and the infrared-cut filter 34 are aligned in the forward/rearward direction at all times. Object light which is passed through the lenses L1, L2 and L3, the infrared-cut filter 34 and the optical low-pass filter 69, is formed as an object image on the imaging surface 66 of the CCD 65. When the electrical board 60 (movable stage 62) is in the initial position (when the electrical board 60 is in the state shown in FIG. 2), the center of the imaging surface 66 of the CCD 65 is positioned on the optical axis O.

As shown in FIG. 2, the electrical board 60 is provided at horizontally opposite ends thereof with a right tongue portion 71 and a left tongue portion 72 which extend rightward and leftward, respectively, and is further provided at a lower end of the electrical board 60 with a lower tongue portion 73 which extends downward.

The right tongue portion 71 and the left tongue portion 72 are positioned to correspond to the aforementioned two X-direction magnetic circuits, respectively (i.e., positioned to face the two X-direction magnets MX in the forward/rearward direction, respectively).

Two planar X-direction drive coils CX having the same specifications are printed on the front surfaces of the right tongue portion 71 and the left tongue portion 72, respectively. The two X-direction drive coils CX lie in a plane parallel to an X-Y plane, are each wound in a coiled shape by over one hundred turns (i.e., are wound in both a direction parallel to the electrical board 60 and in a thickness direction of the electrical board 60), and are aligned in a direction parallel to the pair of X-direction edges 65X of the CCD 65 (in the X-direction in the state shown in FIG. 2). In other words, the positions of the two X-direction drive coils CX are coincident with each other in the direction parallel to the pair of Y-direction edges 65Y (in the Y-direction in the state shown in FIG. 2).

Accordingly, the two X-direction drive coils CX, the front stationary support board 31, the rear stationary support board 32, and the two X-direction magnets MX constitute an X-direction driving device.

As shown in FIGS. 4 through 6, the lower tongue portion 73 is positioned to correspond to the aforementioned two Y-direction magnetic circuits, respectively (i.e., positioned to face the two Y-direction magnets MY in the forward/rearward direction, respectively).

Two planar Y-direction drive coils CYA and CYB having the same specifications are printed on the front surface of the lower tongue portion 73. The two Y-direction drive coils CYA and CYB lie in a plane parallel to the X-Y plane, are each wound in a coiled shape by over one hundred turns (i.e., are wound in both a direction parallel to the electrical board 60 and in a thickness direction of the electrical board 60), and are aligned along the lower X-direction edge 65X of the CCD 65 (in the X-direction in the state shown in FIG. 2). In other words, the positions of the two Y-direction drive coils CYA and CYB are coincident with each other in the direction parallel to the pair of Y-direction edges 65Y (in the Y-direction in the state shown in FIG. 2).

Accordingly, the two Y-direction drive coils CYA and CYB, the front stationary support board 31, the rear stationary support board 32, and the two Y-direction magnets MY constitute an Y-direction driving device.

The two X-direction drive coils CX, and the two Y-direction drive coils CYA and CYA are electrically connected to a controller constructed from a CPU, etc., provided inside the digital camera 20.

The camera-shake correction apparatus 30 carries out camera-shake (hand-shake) correction operations via the controller supplying electric current to the two X-direction drive coils CX, and the two Y-direction drive coils CYA and CYB.

In other words, if electric current is supplied to the X-direction drive coils CX, a linear drive force in either direction FX1 or direction FX2 occurs in the X-direction drive coils CX, as shown in FIG. 2. Similarly, if electric current is supplied to the Y-direction drive coils CYA and CYB, a linear drive force in the either direction FXY or direction FY2 occurs in the Y-direction drive coils CYA and CYB.

As is commonly known in the art, when a camera body is shaked/vibrated in the X-direction or the Y-direction due to hand-shake (camera shake), the amount of movement of the camera body (amount of hand-shake) in the X-direction and the Y-direction is detected, and if the CCD 65 is linearly moved with respect to the camera body by the same amount as the detected amount of hand-shake but in the opposite direction, the hand-shake (camera-shake/image-shake) of the CCD 65 is corrected. Accordingly, in order for the CCD 65 to be linearly moved in such a manner, if electric current is supplied from the controller to the two x-direction drive coils CX, and the two Y-direction drive coils CYA and CYB, camera-shake applied to the CCD 65 in the X-direction and Y-direction is corrected.

Furthermore, since the movable stage 62 (CCD 65) is relatively rotatable with respect to the front stationary support board 31 and the rear stationary support board 32, if the direction of the electric current supplied to the Y-direction drive coil CYA and the Y-direction drive coil CYB are made mutually opposite, so that mutually opposite driving forces occur between the Y-direction drive coil CYA and the Y-direction drive coil CYB, the movable stage 62 (CCD 65) is rotated. Accordingly, if electric current is supplied from the controller to the Y-direction drive coil CYA and the Y-direction drive coil CYB so that the movable stage 62 (CCD 65) is rotated in a rotational direction opposite to the rotational direction of the camera shake, rotational camera-shake can be corrected.

The lock mechanism 100 to which the present invention is applied and is installed in the camera-shake correction apparatus 30 will be mainly described hereinafter with reference to FIGS. 7 through 11.

Figure 3:
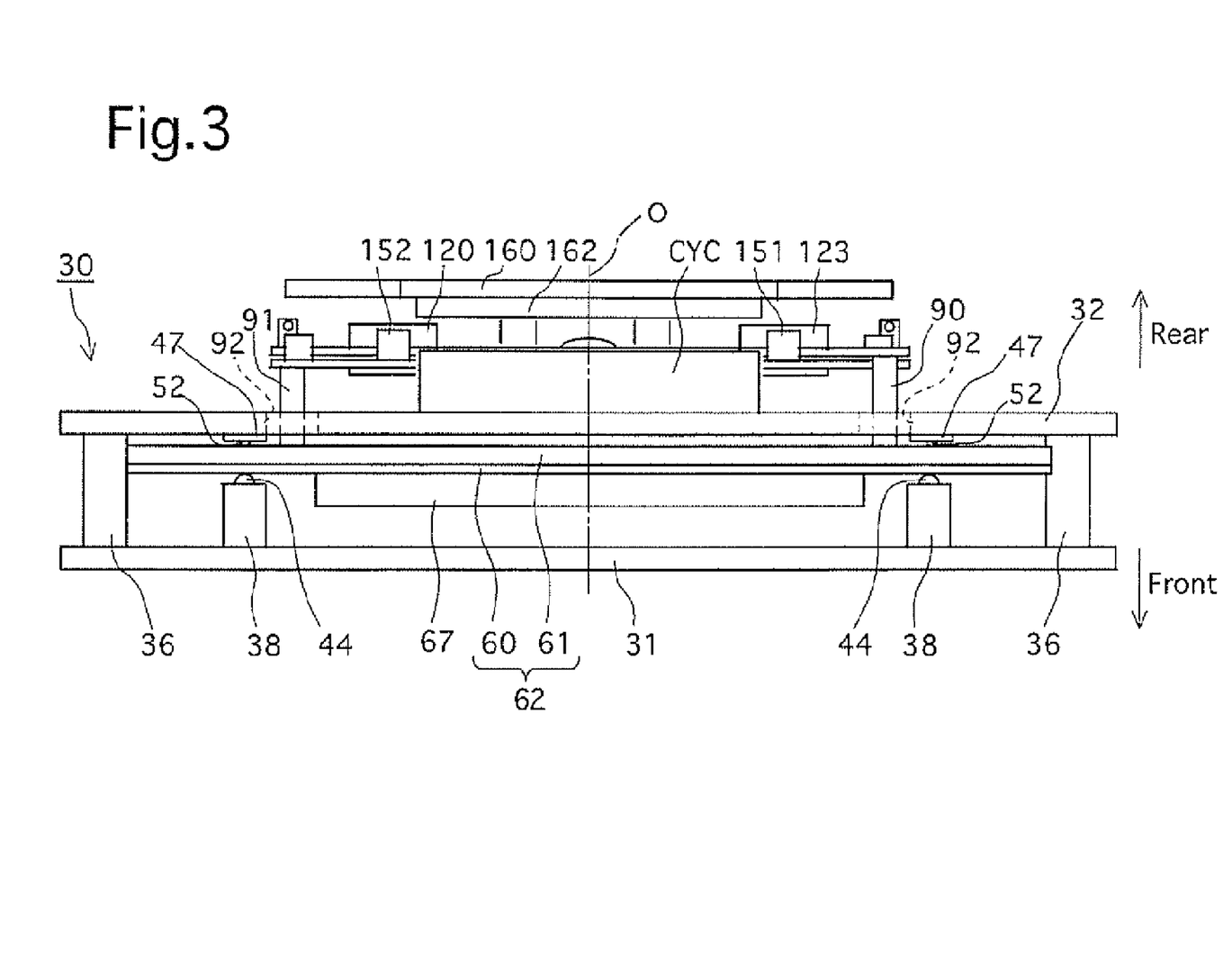
FIG. 3 is a plan view of the camera-shake correction apparatus, as viewed in the direction of the arrow III shown FIG. 2.

As shown in FIGS. 2 through 4, engaging pins (engaging members) 90 and 91 are provided on the back surface of the reinforcing plate 61 of the movable stage 62 so as to project rewards there from and so as to be aligned on the X-direction line LX which passes through the center of gravity of an integral movable body which includes the movable stage 62 and other members integral therewith (the CCD 65, the CCD holder 67, engaging pins 90 and 91, etc.) and are provided at symmetrical positions with respect to a Y-direction line LY with passes through the center of gravity of the integral movable body, with the camera-shake correction apparatus 30 in the initial state shown in FIG. 2. Furthermore, the rear stationary support board 32 is provided with insertion holes (through-holes) 92 which are formed at positions corresponding to the engaging pins 90 and 91. The engaging pins 90 and 91 are inserted through the insertion holes 92, respectively, so as to extend therethrough so that the rear end portions of the engaging pins 90 and 91 project rearwards from the rear stationary support board 32.

A front yoke 101 which is made from a magnetic material such as a soft iron is fixed to the center portion of the rear surface on the rear stationary support board 32 with four mounting screws 102. A pair of upper and lower screw holes 103 and a pair of upper and lower screw holes 104, each aligned vertically (in the Y-direction), are formed on left and right sides of the front yoke 101, respectively, and a screw hole 105 is formed at a substantially central portion of the front yoke 101. A cut-out portion 106 is formed at the lower edge portion of the front yoke 101. Furthermore, the front yoke 101 is provided with four cylindrical support members 108 at four different positions on the rear surface of the front yoke 101 so as to project rearwards therefrom.

A Y-direction slide plate 110, which has an approximate T-shape, is provided behind the front yoke 101 and is slidable in the Y-direction in a plane parallel to the front yoke 101. The Y-direction slide plate 110 has left and right guide slots (through-slots) 111 formed at left and right sides therein and extend in the Y-direction. A mounting screw 112 and a mounting screw 116 are inserted in each of the guide slots 111, so that the left mount screws 112 and 116 are screw-engaged with the upper and lower screw holes 103 of the front yoke 101, and the right mounting screws 112 and 116 are screw-engaged with the upper and lower screw holes 104 of the front yoke 101.

The mounting screws 112 are each provided with a disc-shaped portion 113 having a larger diameter than the width of each guide slot 111 in the X-direction, and the mounting screws 116 are each provided with round head portion 117 having a larger diameter than the width of each guide slot 111 in the X-direction. The disc-shaped portions 113 of the mounting screws 112 and the round head portions 117 of the mounting screws 116 are in contact with the rear surface of the Y-direction slide plate 110 so that the disc-shaped portions 113 and the round head portions 117 always cause the Y-direction slide plate 110 to abut against the front yoke 101.

Figure 8:
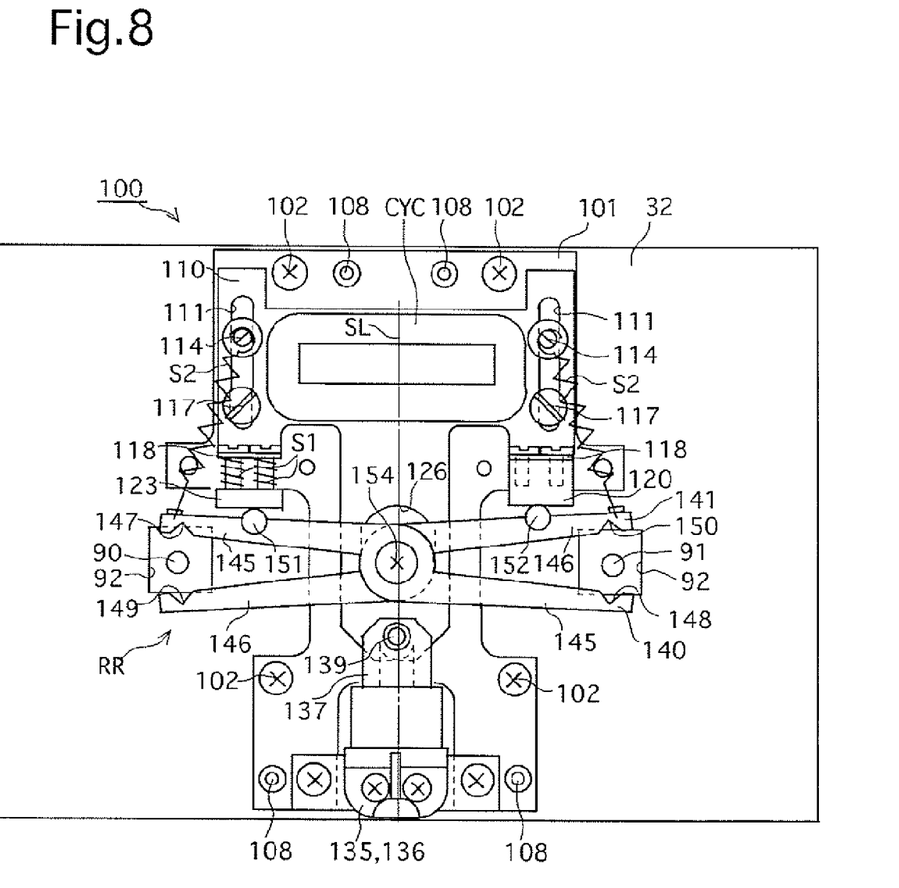
FIG. 8 is a rear view of the lock mechanism in a disengaged state, with a rear yoke omitted for clarity.
Figure 9:
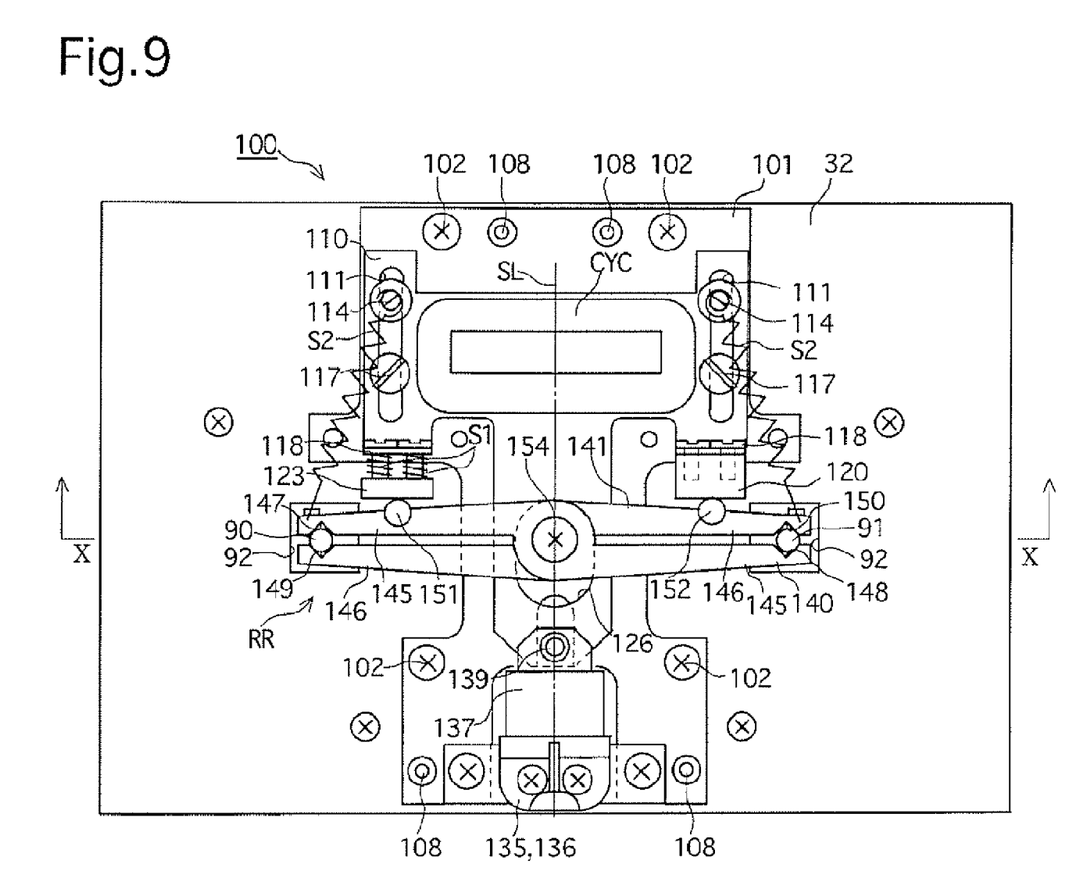
FIG. 9 is a rear view of the lock mechanism in an engaged state, with the rear yoke omitted for clarity.

Hence, the Y-direction slide plate 110 is relatively slidable in the Y-direction with respect to the front yoke 101 due the engaging relationship between the mounting screws 112 and 116 and the guide slots 111, so that the Y-direction slide plate 110 can be moved between a disengaged position shown in FIG. 8 and an engaged position shown in FIG. 9. In addition, spring-hook projections 114 are provided on the rear sides of the disc-shaped portions 113, respectively, so as to project rearwards therefrom.

A pair of left and right rearward-bent pieces 118 are provided at lower left and right ends of the Y-direction slide plate 110 so as to extend rearwards. A cubic shaped abutting member 120, formed from a compound resin, is fixed to the lower surface of the right rearward-bent piece 118 by two mounting screws 121. Two mounting screws 122 are inserted through two through-holes provided in the left rearward-bent piece 118. A metal cubic abutting member 123 is positioned directly underneath the left rearward-bent piece 118, and the two mounting screws 122 are screw-engaged into two screw holes 124 formed in the top surface of the abutting member 123. Additionally, compression springs SI are provided over the left and right mounting screws 122, respectively, between the undersurface of the left rearward-bent piece 118 and the upper surface of the abutting member 123. Due to the biasing force of the compression springs S1, the abutting member 123 is biased downwards, and the head portions of the mounting screws 122 are pressed against the upper surface of the left rearward-bent piece 118.

A Y-direction drive coil CYC is fixed to the rear surface of the Y-direction slide plate 110. The Y-direction drive coil CYC lies in a plane parallel to an X-Y plane and is wound in a coiled shape by over one hundred turns (i.e., is wound in both a direction parallel to the Y-direction slide plate 110 and in a thickness direction of the Y-direction slide plate 110). The Y-direction slide plate 110 is provided with a downward-extending portion 125 which extends downwards from a central portion thereof, and a substantially elliptical through-hole 126 is formed in a central portion of the downward-extending portion 125.

An attachment plate 130 is fixed to the lower edge portions of the front yoke 101 by two mounting screws 131 so as to bridge over the cut-out portion 106 formed in the front yoke 101. The attachment plate 130 is provided with a conventional electromagnetic plunger (first retaining device) 135 having an electromagnet (coil and iron core) installed therein. A magnetic slide plate 137 formed from a magnetic material is inserted into a bottomed rectangular-tube shaped plunger body 136 so as to be movable up and down therein in the Y-direction. A permanent magnetic is also provided inside the plunger body 136 in addition to the above-mentioned electromagnet, so that a major portion of the magnetic slide plate 137 is sunk inside the plunger body 136 (see FIG. 9) by the magnetic force of this permanent magnet when electric current is not supplied to the above-mentioned coil of the electromagnet. Conversely, if electric current is supplied to the coil of the electromagnet, the electromagnet generates a magnetic force strong enough to eliminate (cancel out) the magnetic force of the permanent magnet, so that the major portion of magnetic slide plate 137 can move upward so as to further project from the plunger body 136 (see FIG. 8). The upper edge portion of the magnetic slide plate 137 is linked with the lower edge portion of the downward-extending portion 125 via a linkage pin 139, and accordingly, the magnetic slide plate 137 and the downward-extending portion 125 become integral with each other via the linkage pin 139.

A rotational lock device RR is provided with a pair of arm members 140 and 141.

Each of the pair of arm members 140 and 141 are formed substantially symmetrical with respect to a common rotational axis thereof. The arm members 140 and 141 have round portions 142 and 143 formed at the center portions thereof, respectively. A round hole 144 is provided in the center portion of each of the round portions 142 and 143, so that both of the round holes 144 have the same diameter. The arm member 140 is provided with left and right clasping members 145, and the arm member 141 is provided with left and right clasping members 146. The left clasping member 145 of the arm member 140 is provided on the underside thereof with a V-shaped lock-engaging groove 147, and the right clasping member 145 of the arm member 140 is provided on the upper side thereof with a V-shaped lock-engaging groove 148. The left clasping member 146 of the arm member 141 is provided on the upper side thereof with a V-shaped lock-engaging groove 149, and the right clasping member 146 of the arm member 141 is provided on the underside thereof with a V-shaped lock-engaging groove 150.

Furthermore, a cylindrical abutting member 151 is integrally formed on the left clasping member 145 and extends in the forward/rearward direction. Similarly, a cylindrical abutting member 152 is integrally formed on the right clasping member 146 and extends in the forward/rearward direction. The cylindrical abutting member 151 is always maintained in an abutting relationship with the undersurface of the abutting member 123r and the cylindrical abutting member 152 is always maintained in an abutting relationship with the undersurface of the abutting member 120. Since the cylindrical abutting members 151 and 152 are always in line contact (which is the minimum contacting area) with (interconnect with) the abutting members 123 and 120, respectively (the cylindrical abutting members 151 and 152 having cylindrical surfaces and the abutting members 123 and 120 having flat surfaces), a reliable driving force can always be applied thereby regardless of the rotational positions of the arm members 140 and 141. The arm members 140 and 141 overlap each other so that the round portion 142 of the arm member 140 is positioned immediately behind the round portion 143 of the arm member 141. A mounting screw (rotational shaft) 154 is inserted through each of the round holes 144 of the round portions 142 and 143 in the forward direction so as to pass through the through-hole 126 of the Y-direction slide plate 110 and be screw-engaged with the screw hole 105 of the front yoke 101.

Furthermore, the ends of a left extension spring (unlock driving device/biasing device/second retaining device) S2 are engaged (connected) with an left end portion of the arm member 140 and the left spring-hook projection 114, respectively. Similarly, the ends of a right extension spring (biasing device/second retaining device) S2 are engaged (connected) with a right end portion of the arm member 141 and the right spring-hook projection 114, respectively.

The arm members 140 and 141 are rotatable about the mounting screw 154 relative to the front yoke 101. In other words, the arm members 140 and 141 are rotatable between the disengaged position shown in FIG. 8 in which the V-shaped lock-engaging grooves 147, 148, 149 and 150 are vertically moved away from the corresponding engaging pins 90 and 91 (i.e., the facing V-shaped lock-engaging grooves 147 and 149 provided at left free ends of the arm members 140 and 141, respectively, move away from the engaging pin 90, and the facing V-shaped lock-engaging grooves 148 and 150 provided at right free ends of the arm members 140 and 141, respectively, move away from the engaging pin 91), and the engaged position shown in FIG. 9 in which the V-shaped lock-engaging grooves 147, 148, 149 and 150 clasp the corresponding engaging pins 90 and 91 (i.e., the facing V-shaped lock-engaging grooves 147 and 149 provided at left free ends of the arm members 140 and 141, respectively, clasp the engaging pin 90, and the facing V-shaped lock-engaging grooves 148 and 150 provided at right free ends of the arm members 140 and 141, respectively, clasp the engaging pin 91). The arm members 140 and 141 rotate so that the (common) rotational centers thereof always lie on a Y-direction straight reference line (a straight reference line orthogonal to a straight imaginary line connecting the engaging members 90 and 91) SL (see FIGS. 8 and 9) which passes through an intermediate position (at the center of the mounting screw 154) between the left and right guide slots 111 so that the arm members 140 and 141 are bilaterally-symmetrical about the Y-direction straight reference line SL.

Accordingly, when the Y-direction slide plate 110 is moved from the disengaged position to the engaged position, since the abutting members 120 and 123 press downwards on the cylindrical abutting members 151 and 152 against the biasing forces (extension forces) of the left and right extension springs S2, the arm members 140 and 141 are moved to the engaged position shown in FIG. 9. Note that since the compression springs S1 always bias the abutting member (resiliently biased abutting member) 123 downwards, the 90 and 91 can always be reliably in abutment with the 147, 148, 149 and 150 without any play therebetween. Conversely, when the Y-direction slide plate 110 is moved from the engaged position to the disengaged position, the abutting members 120 and 123 remain in contact with the cylindrical abutting members 151 and 152 due to the biasing forces (extension forces) of the left and right extension springs S2, while the arm members 140 and 141 are moved to the disengaged position shown in FIG. 8.

Figure 7:
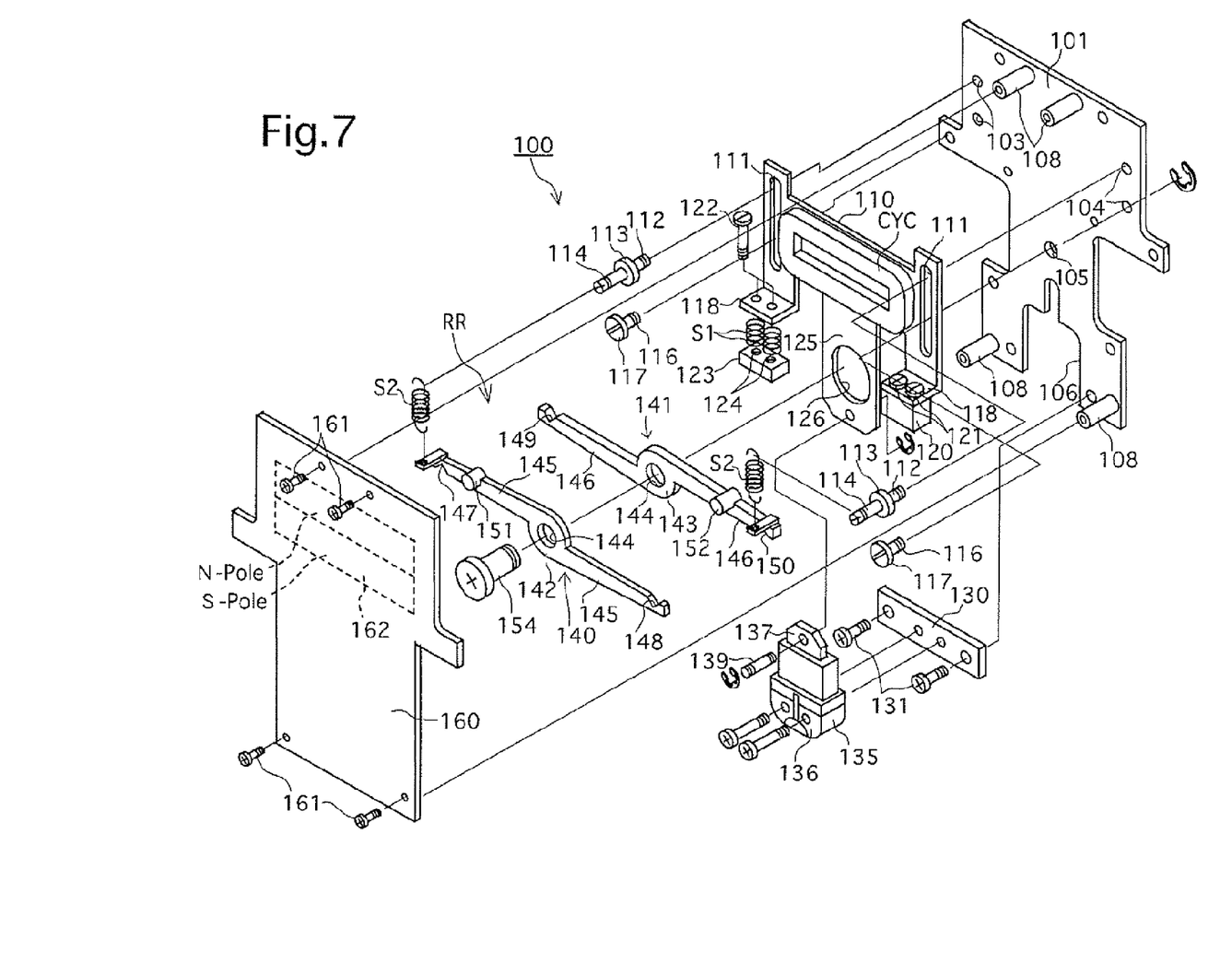
FIG. 7 is an exploded perspective view of a lock mechanism, according to the present invention, which some members thereof omitted for clarity.
Figure 10:
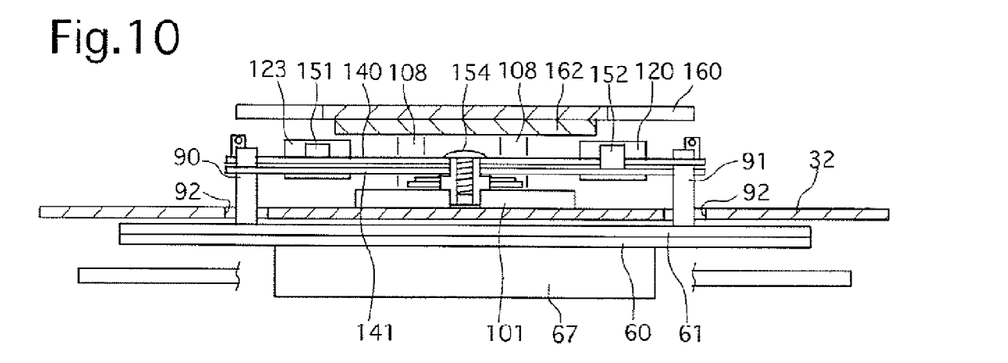
FIG. 10 is a cross section view of the lock mechanism taken along the X-X shown in FIG. 9.

As shown in FIGS. 7 and 10, a front surface of a rear yoke 160, which is made from a magnetic material such as a soft iron, contacts the rear surfaces of each of the four cylindrical support members 108 of the front yoke 101, and the rear yoke 160 is fixed to the four cylindrical support members 108 by four mounting screws 161 at four corresponding positions on the rear yoke 160.

Figure 11:
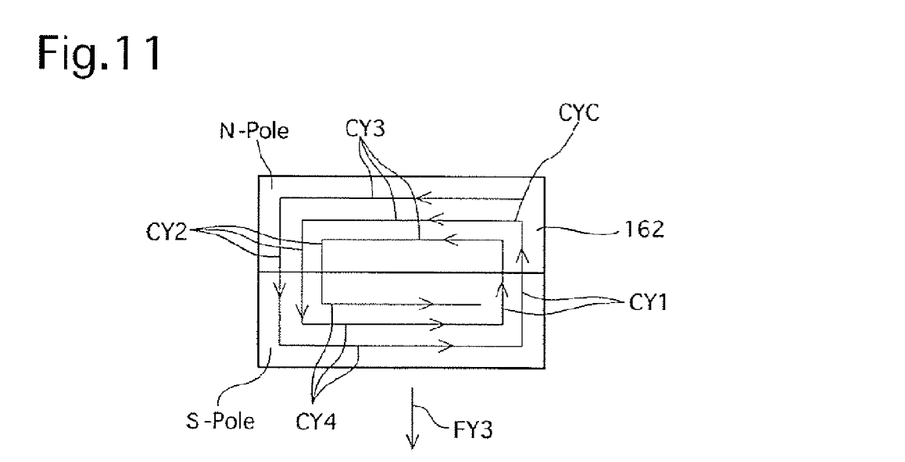
FIG. 11 is an enlarged schematic view of major elements of a drive device of the lock mechanism.

The rear yoke 160 is provided on the front surface thereof with a permanent magnet 162 which faces the Y-direction drive coil CYC in a direction parallel to the optical axis O (Z-direction: see arrow in FIG. 1). As shown in FIGS. 7 and 11, an S-pole and an N-pole of the permanent magnet 162 are aligned in the Y-direction. A magnetic circuit is formed between the permanent magnet 162 and the portion of the front yoke 101 which faces the permanent magnet 162 in the forward/rearward direction (Z-direction) due to the magnetic flux of the permanent magnet 162 passing through the front yoke 101 and the rear yoke 160. The Y-direction drive coil CYC is positioned within this magnetic circuit. As shown in FIG. 11, linear upper sides CY3 of the Y-direction drive coil CYC are aligned with the N-pole of the permanent magnet 162 in the forward/rearward direction, the linear lower sides CY4 of the Y-direction drive coil CYC are aligned with the S-pole of the permanent magnet 162 in the forward/rearward direction, and this alignment relationship (overlapping relationship) is always maintained regardless of the position of the Y-direction slide plate 110.

The front yoke 101, the rear yoke 160, the permanent magnet 162, and the Y-direction drive coil CYC constitute a lock driving device. Furthermore, the front yoke 101, the rear yoke 160 and the permanent magnet 162 constitute a magnetic-force generator.

The operation of the above-described lock mechanism 100 will be described hereinafter.

The Y-direction drive coil CYC and the aforementioned coil provided in the plunger 135 are electronically connected to the aforementioned controller provided inside the digital camera 20.

When a camera-shake correction switch SW (shown in FIG. 1), provided on the camera body, is OFF, the movable stage 62 is at the initial position (non-operational state) as shown in FIG. 2, and the controller does not supply any electric current to the Y-direction drive coil CYC. As shown in FIG. 9, the V-shaped lock-engaging grooves 147 and 148 of the arm member 140 and the V-shaped lock-engaging grooves 149 and 150 of the arm member 141 clasp the upper and lower sides of the engaging pins 90 and 91, respectively, so that the engaging pins 90 and 91 are locked and the movable stage 62 is maintained at the initial position shown in FIG. 2. Furthermore, since the magnetic force of the aforementioned permanent magnet provided inside the plunger 135 is stronger than tension of the extension spring S2, the magnetic slide plate 137 is positioned at the position shown in FIG. 9 due to the magnetic force of this permanent magnet. Accordingly, the magnetic slide plate 137 maintains the engaged position (locked position) of the Y-direction slide plate 110, and the arm members 140 and 141.

In this engaged position, if the camera-shake correction switch SW is turned ON, electric current is instantaneously supplied from the controller to the coil of the plunger 135. Accordingly, this coil and the aforementioned iron core temporarily act as an electromagnet, so that the magnetic force of the permanent magnet provided inside the plunger 135 is cancelled out. Accordingly, the magnetic slide plate 137 can move upwards from the plunger body 136 in the projecting direction (upward direction). In this state, since the biasing force of the left and right extension springs S2 is also exerted on the Y-direction slide plate 110 (via the cylindrical abutting members 151 and 152 formed on the left and right clasping members 145 and 146 of the arm members 140 and 141, respectively, and the undersurface of the abutting members 123 and 120, respectively), the Y-direction slide plate 110 is moved upwards so that the Y-direction slide plate 110, and the arm members 140 and 141 are moved from the engaged position (FIG. 9) to the disengaged position (FIG. 8). Therefore, since the V-shaped lock-engaging grooves 147, 148, 149 and 150 are vertically moved (upward and downward) away from the corresponding engaging pins 90 and 91, the engaging pins 90 and 91 are released from the locked state thereof. Furthermore, the left and right extension springs S2 maintain this disengaged state. Accordingly, the movable stage 62 and the CCD 65 enter an operational state in which a camera-shake correction operation can be carried out thereon.

Upon the camera-shake correction operation being completed whereby the camera-shake correction switch is turned OFF, the controller supplies electric current to the two X-direction drive coils CX and the two Y-directions drive coils CYA and CYB, so that the movable stage 62 is returned to the initial position (non-operational state) as shown in FIG. 2. Furthermore, electric current is supplied from the controller to the Y-direction drive coil CYC in the direction shown by the arrows in FIG. 11. Accordingly, since a linear drive force (which is stronger than the biasing forces of the extension springs S2) in a direction FY3 occurs in the Y-direction drive coil CYC, as shown in FIG. 11, the Y-direction slide plate 110 moves downward so that the Y-direction slide plate 110 and the arm members 140 and 140 move from a disengaged position (FIG. 8) to an engaged position (FIG. 9), and the V-shaped lock-engaging grooves 147, 148, 149 and 150 re-engage with (clasp) the engaging pins 90 and 91, respectively, to thereby lock the engaging pins 90 and 91.

When the Y-direction slide plate 110 and the arm members 140 and 140 reach the engaged position, supply of electric current from the controller to the Y-direction drive coil CYC is stopped. This engaged position is maintained by the plunger 135 against the biasing force of the extension springs S2. Therefore, the movable stage 62 and the CCD 65 are in the initial position in a state where a camera-shake correction operation cannot be carried out.

According to the above description of the present invention, since the pair of arm members 140 and 141 lock the engaging pins 90 and 91 in a short amount of timer the CCD 65 (movable stage 62) can be securely locked in a short amount of time. Furthermore, compared to the prior art in which one boss (engaging pin) is clasped and locked by abutting members (lock members), a firmer (stronger) locking state can be achieved with the lock mechanism 100 of the present invention using the same driving force.

Furthermore, since the movable stage 62 (CCD 65) is rotatable relative to the front stationary support board 31 and the rear stationary support board 32, if only one lock pin (engaging pin) were to be provided as in the prior art, even if the lock pin were to be locked by lock members, rotation of the movable stage 62 (CCD 65) could not be prevented. However, if a construction is provided like that of the present invention in which a pair of engaging pins (the engaging pins 90 and 91) are locked by a pair of arm members (the pair of arm members 140 and 141), rotation of the movable stage 62 (CCD 65) can be prevented, and hence, the lock mechanism 100 demonstrates a special benefit when applied a camera-shake correction apparatus (camera-shake correction apparatus 30) in which rotational camera-shake can be corrected.

In addition, when the lock mechanism 100 is locked and unlocked, the engaged position and disengaged position of the arm members 140 and 141 are retained by the magnetic force of the permanent magnet provided in the plunger 135 and the biasing force of the extension springs S2 without using electrical power. Furthermore, since the arm members 140 and 141 are moved from the engaged position to the disengaged position using the biasing force of the extension springs S2, electrical power consumption can be drastically reduced compared to the case where the retaining and moving of the arm members 140 and 141 are carried out electrically.

Furthermore, since the arm members 140 and 141 engage with the engaging pins 90 and 91 so that the engaging pins 90 and 91 are clasped with an equal force in directions above and below therefrom, no force is exerted on the engaging pins 90 and 91 in the direction of the optical axis O during a locking operation. Accordingly, no adverse effect on the focus state of the CCD 65 occurs during a locking operation.

Since the arm members 140 and 141 do not exert a force on the engaging pins 90 and 91 which would cause them to deform/bend during a locking operation, the CCD 65 (movable stage 62) is not deformed/bent during a locking operation and does not move at all in the direction of the optical axis O. Therefore, no adverse effect on the object image (captured image) caused by deforming/bending of the CCD 65 occurs.

Furthermore, since the lock mechanism 100 which uses the pair of arm members 140 and 141 is simple in structure, a reduction in manufacturing costs is possible, and the lock mechanism 100 has superior durability.

Since the two mounting screws 122 are adjustable in the Y-direction relative to the left reward-bent piece 118 of the Y-direction slide plate 110, and the compression springs S1 are provided over the left and right mounting screws 122, respectively, between the undersurface of the left rearward-bent piece 118 and the upper surface of the abutting member 123, even if manufacturing/assembly error occurs in the relative positions of the abutting member 123 and the cylindrical abutting member 1511 such error can be absorbed. Therefore, even if such manufacturing/assembly error occurs, the engaging pins 90 and 91 can still be securely locked by the V-shaped lock-engaging grooves 147, 148, 149 and 150 of the arm members 140 and 141.

Furthermore, since the V-shaped lock-engaging grooves 147, 148, 149 and 150 have a V cross-sectional shape, when the V-shaped lock-engaging grooves 147, 148, 149 and 150 engage with the engaging pins 90 and 91, the engaging pins 90 and 91 are automatically moved into the base portions of the V-shaped lock-engaging grooves 147, 148, 149 and 150. Hence, the engaging pins 90 and 91 can be securely engaged into the V-shaped lock-engaging grooves 147, 148, 149 and 150.

Although the present invention has been described with reference to the above embodiment, the present invention is not limited thereto, and various modifications of the above described embodiment are possible.

For example, although the Y-direction slide plate 110 is biased to move toward the disengaged position by the extension springs S2, a biasing device other than the extension springs S2 can be used. For instance, the Y-direction slide plate 110 can be biased to move toward the disengaged position by compression springs.

In addition, the driving device for moving Y-direction slide plate 110 can alternatively be a motor or an piezoelectric element.

Furthermore, the engaging members which can be used are not limited to the engaging pins 90 and 91; protrusions having a rectangular/square columnar shape or protrusions having an alternative sectional shape can be used so long as such protrusions are engageable with the V-shaped lock-engaging grooves 147, 148, 149 and 150. Moreover, the V-shaped lock-engaging grooves 147, 148, 149 and 150 can have a shape other than a V-shape, e.g., an arc shape.

An image pickup device other than a CCD (CCD 65) can be used, e.g., a CMOS imaging sensor can of course be alternatively used.

Furthermore, a convention camera-shake (hand-shake) correction apparatus which only linearly moves the movable stage 62 in the X-direction and the Y-direction can be applied to the lock mechanism 100 of the present invention, or a stage apparatus (an apparatus in which a specific member is linearly movable in the X-direction and/or Y-direction, or rotatable) having a different usage to that of a camera-shake correction apparatus can be applied to the lock mechanism 100 of the present invention.

Although in the illustrated embodiment the cylindrical abutting members 151 and 152 are integrally formed on the left clasping member 145 and the right clasping member 146, respectively, in an alternative embodiment, the cylindrical abutting members 151 and 152 can be provided on the abutting members 123 and 120, respectively, so that the cylindrical abutting members 151 and 152 abut against flat upper surfaces of the left clasping member 145 and the right clasping member 146, respectively.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lock mechanism for a stage apparatus, said stage apparatus having a stationary support board and a movable stage which is relatively movable in a plane parallel to said stationary support board, comprising:

a pair of engaging members which project from a surface of said movable stage;

a rotational lock device including a pair of arm members rotatably mounted at center portions thereof on a common rotational shaft so that said arm members are relatively rotatable to each other, wherein said arm members are rotatable between an engaged position at which one and the other pairs of facing free ends of said arm members clasp corresponding one and the other said engaging members, and a disengaged position at which said one and the other of said pairs of facing free ends of said arm members move away from said corresponding one and the other said engaging members;

a lock driving device which rotates said arm members to said engaged position upon said movable stage entering a non-operational state; and an unlock driving device which rotates said arm members to said disengaged position so that said movable stage enters an operational state.

2. The lock mechanism for the stage apparatus according to claim 1, further comprising:

a slide plate which is movable, relative to said stationary support board, between said engaged position and said disengaged position in a direction along a straight reference line orthogonal to a straight imaginary line connecting said engaging members;

wherein said lock driving device drives said slide plate so as to move to said engaged position.

3. The lock mechanism for the stage apparatus according to claim 2, wherein said one and the other pairs of said facing free ends of said arm members clasp said one and the other said engaging members at positions symmetrical to said straight reference line.

4. The lock mechanism for the stage apparatus according to claim 2, wherein said lock driving device comprises:
   a magnetic-force generator mounted on said stationary support board; and
   a drive coil mounted on said slide plate, said drive coil generating a driving force in a direction along said straight reference line upon electric current being supplied to said drive coil while receiving a magnetic force from said magnetic-force generator.

5. The lock mechanism for the stage apparatus according to claim 1, wherein a biasing device is provided on each said arm member so as to rotationally bias said each arm member toward said disengaged position.

6. The lock mechanism for the stage apparatus according to claim 2, further comprising:
   a first retaining device for holding said slide plate at said engaged position upon said slide plate moving to said engaged position; and
   a second retaining device for holding said slide plate at said disengaged position upon said slide plate moving to said disengaged position.

7. The lock mechanism for the stage apparatus according to claim 6, wherein said second retaining device comprises a biasing device provided on each of said arm member so as to rotationally bias said each arm member toward said disengaged position.

8. The lock mechanism for a stage apparatus according to claim 2, further comprising:
   a pair of flat abutting members provided on said slide plate; and
   a pair of cylindrical abutting members provided on one of said flat abutting members and said pair of arm members,
   wherein said slide plate and said pair of arm members are interconnected via said flat abutting members and said cylindrical abutting members.

9. The lock mechanism for a stage apparatus according to claim 8, wherein one of said flat abutting members comprises a resiliently biased abutting member which is resiliently biased so as to abut against corresponding one of said cylindrical abutting members so that said slide plate contacts said pair of arm members via said resiliently biased abutting member.

\* \* \* \* \*